J. SZCZUREK.
DOOR OPENER FOR RAILROADS.
APPLICATION FILED MAR. 22, 1922.
1,418,406.
Patented June 6, 1922.
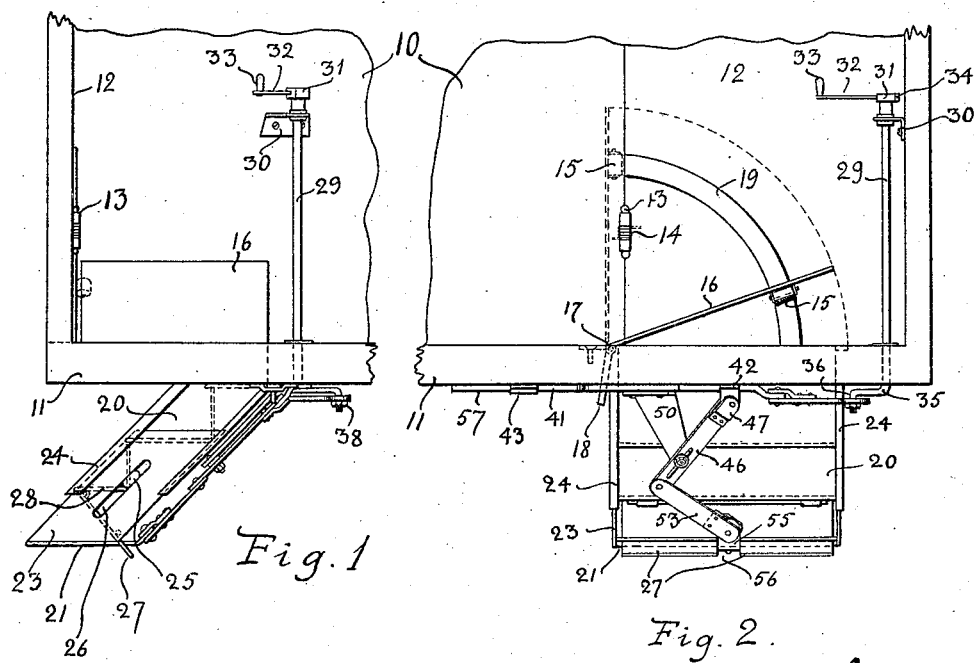
Fig. 1.
Fig. 2.
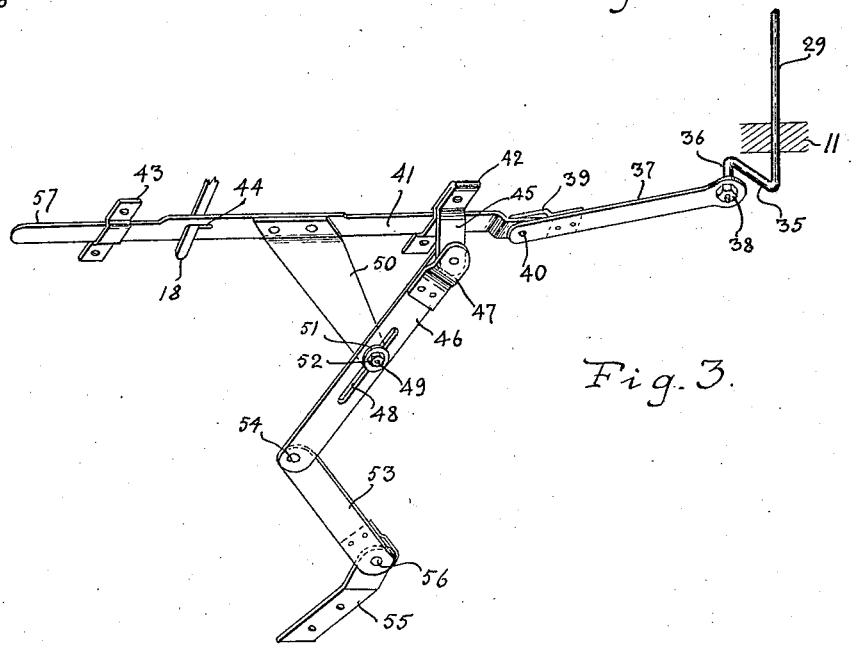
Fig. 3.
INVENTOR.
Joe Szczurek
BY
George C. Heinroke
ATTORNEY.

UNITED STATES PATENT OFFICE.

JOE SZCZUREK, OF CHICAGO HEIGHTS, ILLINOIS.

DOOR OPENER FOR RAILROADS.

1,418,406.  Specification of Letters Patent.  Patented June 6, 1922.

Application filed March 22, 1922. Serial No. 545,705.

*To all whom it may concern:*

Be it known that I, JOE SZCZUREK, a citizen of Poland, residing at Chicago Heights, county of Cook, and State of Illinois, have invented certain new and useful Improvements in Door Openers for Railroads, of which the following is a specification.

This invention relates to improvements in passenger railway cars and particularly to improvements in the construction and operation of the extensible steps leading from and into the vestibules of such cars.

It is the principal object of the invention to provide means for manually operating these steps which are capable of being lengthened or shortened simultaneously with the operation of the step covers.

Another object of the invention is the provision of a hand operated lever mechanism of an extremely simple and inexpensive yet efficient construction for simultaneously raising the step covers, and extending the steps to let the vestibule door swing automatically into open position, so that the simple operation of a hand lever will be sufficient to prepare the steps of a passenger train for the discharge and boarding of passengers.

These and other objects of my invention will become more fully apparent as the description thereof proceeds, and will then be specifically pointed out in the appended claims.

In the accompanying drawing, forming a material part of this disclosure,

Figure 1 is a fragmentary side view of a car vestibule equipped with the device constructed according to the present invention, the step cover being partly raised.

Figure 2 is a rear view of the features illustrated in Figure 1.

Figure 3 is a detail view of the step operating lever mechanism.

Referring to the drawing in detail, the vestibule 10 of a railroad car 11 is equipped with a door 12 on hinges 13 provided with suitable springs 14 effecting an automatic opening of the door when the same is released by the roller 15 secured to the lower face of a step cover 16 at the outer edge thereof. This step cover 16 is hinged to the floor of the car 11 as at 17 and one end of the pintle of hinge connection 17 is angularly bent as at 18 for a purpose to be more fully described hereafter. The roller 15 is gliding along a curved guide strip 19 on door 12.

The step of the car is generally indicated at 20 and is of the extension type as for instance described in my co-pending application Serial No. 466,725, filed May 4, 1921 in which a lower movable step 21 is connecting the ends of two side bars 22, 23 which slide in guides 24 of the side bars of the step provided with a lateral pin or boss 25 sliding in longitudinal slots 26 of the bars 22 and 23. The step 21 is connected by a hinge plate 27 to the lower step board 28 of the step 20.

The extension of the movable step 21 is effected by means of a lever system comprising a vertical bar 29 guided and held in position near its upper end by a bracket 30 secured to the side wall of the vestibule 10, and carrying at its upper end a head 31 provided with a bore or hole through which the horizontal bar 32 of an operating handle 33 is sliding provided at its rear end with a step 34. The lower end of bar 29 is extended through the floor of car 11 and bent to form below said floor, an arm 35 having a depending finger 36 at its extreme outer end. This finger is guided through the rounded part at the end of a lever 37 and upon the lower end of said finger below lever 37 a nut 38 is secured.

An angular lug 39 is secured to the opposite end of lever 37 and between the space formed by one end of said lug and the end of lever 37 is pivotally secured as at 40, the bent end of a rod 41 sliding in guides 42 and 43 fastened to the under side of the bottom or floor of car 11. Near guide 43 this rod 41 has a longitudinal slot 44 through which the lower bent end of the hinge pintle 18 extends.

To the guide 42 a downwardly extending inclined arm 45 is secured, the lower end of which has pivotally secured thereto one end of a bar 46 and one arm of an angular bracket 47 the other arm of which is secured to bar 46. This bar has a longitudinal slot 48 intermediate its ends in which a pin 49 slides at the lower end of a plate 50 secured with its opposite end to the under face of rod 41. A washer 51 and nut 52 hold the pin 49 in place without interfering with its free movement in slot 48. To the free end of bar 46 a link 53 is pivotally secured as at 54 to the free end of which one end of an arm 55 is pivotally secured as at 56, the opposite free end of which is secured to the underside of step 21 and for this purpose is passed through a recess 56 in hinge plate 27. The free end of rod 41 projects, as indicated at 57 through guide 43.

The device operates as follows—

If it is desired to raise the step cover 16 and extend the lower step 21 so that the door 12 will spring open automatically under the action of its hinge springs 14, the handle 33 is operated to draw rod 41 toward the right, by means of finger 36, the hinge pintle 18 will be moved to the right and swing the step cover into open position, its roller 15 gliding along track 19.

The operation of rod 41 will also operate arm 50 to swing bar 46, link 53 and arm 55 into alignment which operation will swing the lowermost step 21 into its extended position.

In order to close the step cover and the door again and to fold the lowermost step 21 against step 28, it will only be necessary to turn handle 33 in the opposite direction.

Changes may be made in the general arrangement of my device and in the construction of the minor details thereof without departing from the scope and spirit of my invention.

What I claim as novel and desire to secure by Letters Patent of the United States is—

1. A device of the character described comprising in combination with the hinged vestibule doors, hinged step covers and extensible steps of passenger cars, a slotted operating rod slidably secured to the bottom of the car, the pintle of the hinge of said step covers extended through the slot of said rod, a system of levers adapted to be operated by said rod to extend or fold the extensible step, means for manually operating said rod, a curved guide strip on said door, a roller secured to the under face of said step cover adapted to be guided along said guide strip, and springs at the hinges of said door for automatically opening said door upon its release by said roller.

2. A device of the class described, comprising in combination with the spring controlled hinged vestibule doors, hinged step covers, and extension steps of passenger cars, a system of levers, comprising a horizontal, slotted operating rod slidably secured to the bottom of a car, guides for said rod, means for manually operating said rod in one and the other direction, a slotted arm pivotally secured to an arm of one of said guides, a pin sliding in the slot of said arm and secured to an inclined bracket secured to said operating rod, and a link and arm connecting said slotted end to the lowermost of said extension steps, the pintle of said step cover engaging the slot of said horizontal operating rod.

3. A device of the character described comprising in combination with the spring hinged vestibule doors having an inner curve guideway, hinged step covers, and extension steps of a railroad passenger car, a longitudinally sliding operating rod, guides for guiding and holding said rod on the lower face of a car bottom, a roller on the lower face of said step cover adapted to engage the curved guideway of said door, the pintle of the hinge of the step cover guided downwardly to extend through the rear of said operating rod, a vertical post extending through the car bottom and connected to one end of said operating rod, a perforated head on said post, an operating handle sliding in said head, a stop for limiting the movement of said handle in one direction, and a lever system connecting said operating rod to the extension steps to extend and contract the same upon the operation of said handle to open and close the step covers, the spring hinges of said door allowing an automatic opening of the same upon the disengagement of its guideway from said roller, substantially as described and for the purpose set forth.

In testimony whereof I have affixed my signature.

JOE SZCZUREK.